(12) United States Patent
Malone

(10) Patent No.: US 6,757,950 B2
(45) Date of Patent: Jul. 6, 2004

(54) ROTATABLE QUICK CONNECTOR STUFFER PIN

(75) Inventor: Dave S. Malone, Attica, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/295,438

(22) Filed: Nov. 15, 2002

(65) Prior Publication Data

US 2004/0093708 A1 May 20, 2004

(51) Int. Cl.⁷ .............................................. B23P 19/02
(52) U.S. Cl. ........................ 29/235; 138/89; 138/109; 285/319
(58) Field of Search ........................ 138/89, 109, 89.2, 138/89.4, 96 R, 96 T, 113; 285/319, 317, 320, 340, 921

(56) References Cited

U.S. PATENT DOCUMENTS

| | | |
|---|---|---|
| 730,378 A | 6/1903 | Lambert |
| 1,232,272 A | 7/1917 | Frazier et al. |
| 1,837,345 A | 12/1931 | Thomas |
| 1,976,589 A | 10/1934 | Trickey |
| 3,120,968 A | 2/1964 | Calvin |
| 3,780,773 A | 12/1973 | Haugen |
| 4,093,279 A | 6/1978 | Verdesca et al. |
| 4,136,885 A | 1/1979 | Uhrner |
| 4,158,407 A | 6/1979 | Rest |
| 4,193,616 A | 3/1980 | Sarson et al. |
| 4,376,525 A | 3/1983 | Fremy |
| 4,423,892 A | 1/1984 | Bartholomew |
| 4,483,371 A | 11/1984 | Susin |
| 4,483,543 A | 11/1984 | Fisher, Jr. et al. |
| 4,601,497 A | 7/1986 | Bartholomew |
| 4,632,434 A | 12/1986 | Proctor et al. |
| 4,647,012 A | 3/1987 | Gartner |
| 4,681,351 A | 7/1987 | Bartholomew |
| 4,753,458 A | 6/1988 | Case et al. |
| 4,846,506 A | 7/1989 | Bocson et al. |
| 4,915,136 A | 4/1990 | Bartholomew |
| 5,033,513 A | 7/1991 | Bartholomew |
| 5,168,902 A | 12/1992 | Hood |
| 5,195,787 A | 3/1993 | Bartholomew |
| 5,342,095 A | 8/1994 | Klinger et al. |
| 5,364,131 A | 11/1994 | Hartsock et al. |
| 5,472,016 A | 12/1995 | Szabo |
| 5,492,371 A | 2/1996 | Szabo |
| 5,542,716 A | 8/1996 | Szabo |
| 5,707,084 A | 1/1998 | Szabo |
| 5,730,481 A | 3/1998 | Szabo et al. |
| 5,782,502 A | 7/1998 | Lewis |
| 5,863,077 A | 1/1999 | Szabo et al. |
| 5,882,048 A | 3/1999 | Kawasaki et al. |
| 5,924,746 A | 7/1999 | Fixemer |
| 5,951,063 A | 9/1999 | Szabo |
| 6,155,612 A | 12/2000 | Szabo |
| 6,173,998 B1 | 1/2001 | Bock |
| 6,371,529 B1 | 4/2002 | Szabo et al. |

Primary Examiner—Joseph J. Hail, III
Assistant Examiner—Daniel Shanley
(74) Attorney, Agent, or Firm—Young & Basile, P.C.

(57) ABSTRACT

A stuffer pin for a rotatable, two part fluid quick connector carries the seal elements and a retainer housing carrying a retainer for mounting the seal elements in the bore of a first component of the fluid quick connector and positioning the retainer housing for locking and rotatable engagement with the first component. A flange on the stuffer pin prevents premature movement of the retainer in the retainer housing to the fully latched position until the stuffer pin is removed from the assembled two part fluid quick connector. The flange does not interfere with the ability of the stuffer pin to carry an axially displaceable retainer in the retainer housing.

16 Claims, 4 Drawing Sheets

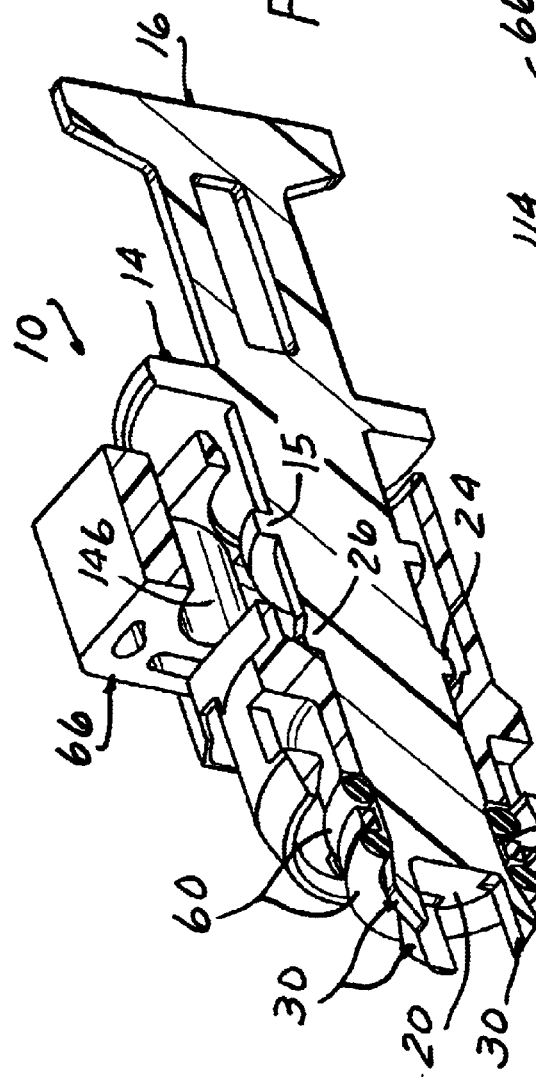
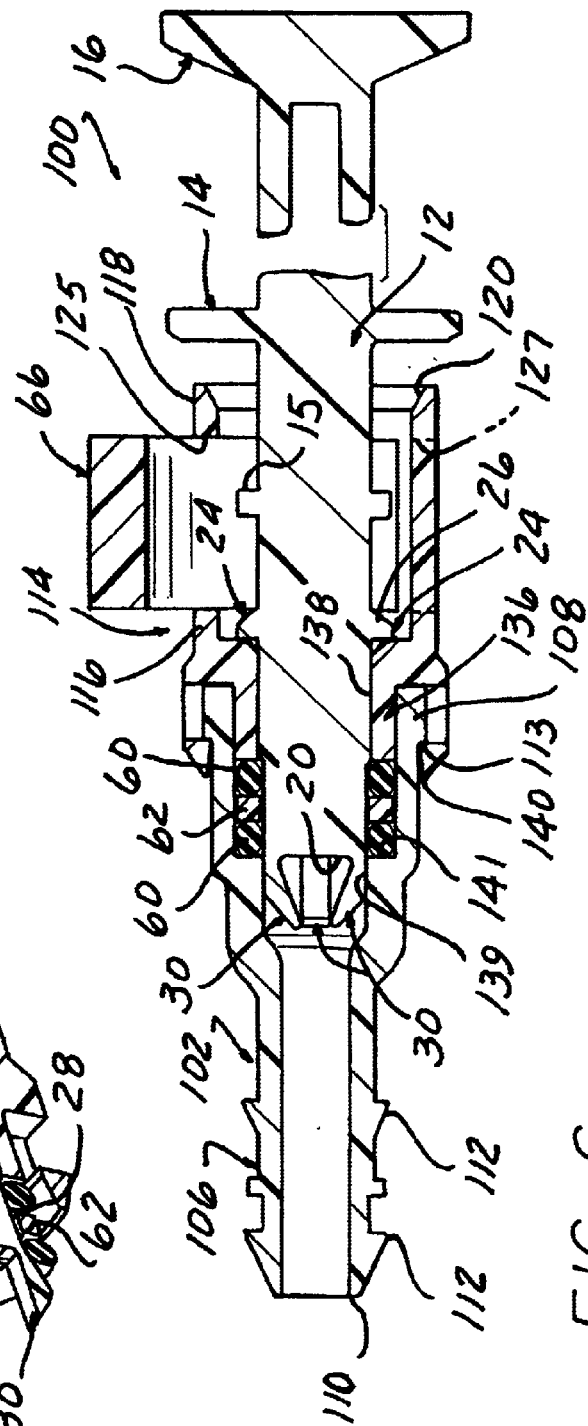

ROTATABLE QUICK CONNECTOR STUFFER PIN

BACKGROUND

The present invention relates, in general, to fluid quick connector assemblies which couple fluid carrying components and, more specifically, to fluid quick connector stuffer pins which pre-mount seal elements in one of the components.

Snap-fit or quick connectors are employed in a wide range of applications, particularly, for joining fluid carrying conduits in automotive and industrial application. In a typical quick connector with an axially displaceable retainer, the retainer is fixedly mounted within a bore in a housing of a female connector component or element. The retainer has a plurality of radially and angularly extending legs which extend inwardly toward the axial center line of the bore in the housing. A tube or male fitting to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs.

Radially displaceable retainers in which the retainer is radially displaceable through aligned bores or apertures formed transversely to the main through bore in the female component or housing are also known. The radially displaceable retainer is typically provided with a pair of depending legs which are sized and positioned to slip behind the radially upset portion or flange on the male conduit only when the male connector or conduit is fully seated in the bore in the female connector. This ensures a positive locking engagement of the conduit with the female connector as well as providing an indication that the conduit is fully seated since the radially displaceable retainer can be fully inserted into the female connector only when the conduit has been fully inserted into the bore in the female connector.

Regardless of the type of retainer, the female housing or component portion of a fluid connector typically includes an elongated stem having one or more annular barbs spaced from a first end. The barbs provide secure engagement with a hose or conduit which is forced over the barbs to connect the female housing with one end of the conduit.

Due to the secure engagement between the conduit and the female component, the open end of the axial through bore in the female connector portion of a fluid connector designed with an axially displaceable retainer or the transverse bores in a female connector designed to receive a radially displaceable retainer are fixed in one circumferential position depending upon the position of the tubing and the female connector when the tubing and female connector are joined together. In certain applications, this could limit accessibility to and make it difficult to insert the retainer into the female component, particularly in the case of a radial retainer. Interference with surrounding components frequently makes access to the quick connector for both locking or unlocking operations difficult, if not impossible.

Thus, two part fluid quick connectors which are easily rotatable over 360° to facilitate insertion or removal of the retainer into or out of the quick connector have been devised. In such quick connectors, the quick connector housing, typically of one piece construction, is replaced with two engagable portions, one attachable to or mountable on a fluid component, such as a tube or conduit, and the other receiving a second conduit or endform as well as receiving the retainer for locking the first component and the second endform together.

While stuffer pins for fluid connectors having a one piece housing have been used for assembling the multiple seal elements or O-rings, a spacer, a top hat and the retainer in the connector housing, such stuffer pins designed for one piece connector housings are not usable with two part housings, particularly two part housings wherein the retainer carrying component is devised for a non-axial or radially displaceable retainer.

Thus, it would be desirable to provide a rotatable two piece quick connector stuffer pin which provides the known advantages of stuffer pins in preassembling components in a fluid connector while at the same time being usable with two part fluid quick connector housings carrying either radial or axial type retainers.

SUMMARY

The present invention is a rotatable quick connector stuffer pin which uniquely enables the seal elements and a retainer housing to be mounted to first component or housing of the fluid quick connector.

In one aspect, the stuffer pin includes a first housing having a bore extending between first and second ends and receiving at least one seal element, and a retainer housing having a bore extending between first and second ends, the retainer housing rotatably joinable to the first housing, a retainer carried in the retainer housing for locking a tubular member in the joined first housing and the retainer housing, the stuffer pin comprising a shaft with first and second ends, the shaft configured for carrying at least one seal member, a retainer housing and a retainer in the retainer housing, between the first and second ends for mounting to the first housing.

In another aspect, a flange is carried on the shaft between the first and second ends of the shaft. The flange is positioned to prevent radial movement of the retainer from a first, partially inserted, shipping position to a second, fully inserted, latching position prior to removal of the stuffer pin from the retainer housing. At the same time, the flange does not interfere with pre-mounting of an axially displaceable retainer carried in the retainer housing to the first housing component.

The stuffer pin of the present invention uniquely enables the seal elements as well as a retainer carrying retainer housing to be mounted to a first housing component of the quick connector in a simple plug-in insertion step. At the same time, the stuffer pin is configured to prevent movement of a radially displaceable retainer in the retainer housing from moving from the partially inserted, shipping position to the fully inserted latching position before the stuffer pin is removed from the joined first and second connector components. This insures that the retainer is in the first position allowing easy insertion of an endform into the aligned bores in the first and second housing components to fluidically connect the conduit or endform to the joined first and second housing components. At the same time, the stuffer pin, and the flange which prevents premature movement of the retainer, does not interfere with the use of the stuffer pin to carry a retainer housing with an axially displaceable retainer.

BRIEF DESCRIPTION OF THE DRAWING

The various features, advantages and other uses of the present invention will become more apparent by referring to the following detailed description and drawing in which:

FIG. 5 is a longitudinal, cross-sectional view taken along line 5—5 in FIG. 4;

FIG. 6 is a longitudinal, cross-sectional view showing the insertion of the stuffer pin and fluid quick connector components of FIG. 4 in the quick connector housing shown in FIG. 2;

DETAILED DESCRIPTION

Figure 1:
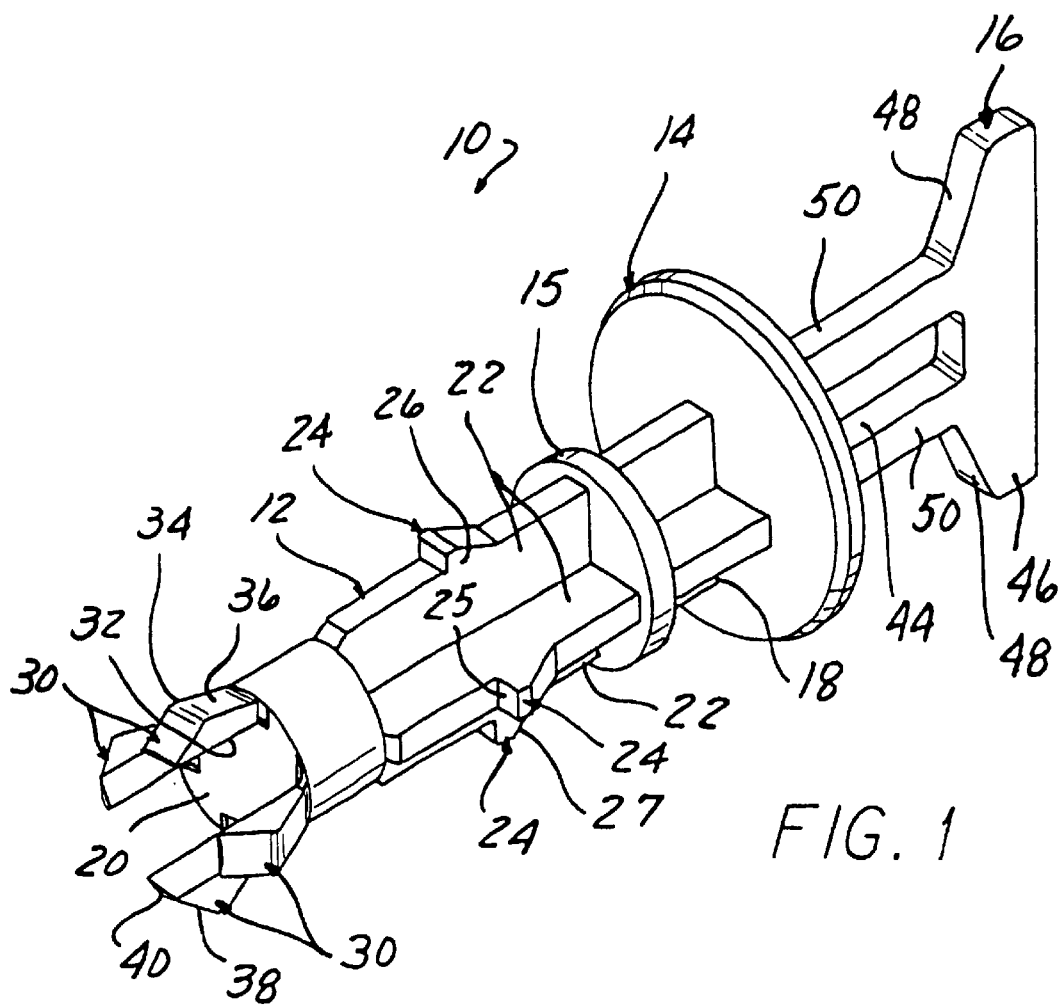
FIG. 1 is a perspective view of a stuffer pin according to the present invention.

Referring now to the drawing, and to FIGS. 1 and 4–8 in particular, there is depicted a stuffer pin apparatus or assembly 10 usable with fluid quick connectors and, more particularly, fluid quick connectors having two rotatable components, one receiving a retainer and a second mountable to or carried on a separate fluid component, such as a tubular conduit described by example only hereafter.

The stuffer pin 10 of the present invention is designed to mount seal elements and a retainer of a two part, rotatable quick connector housing in a bore in the first component of the fluid quick connector.

As shown in FIG. 1, the stuffer pin 10 is in the form of a one-piece body, preferably formed of a suitable plastic material. The stuffer pin includes a shaft 12, a stop 14, and a handle means 16.

The shaft 12 has a tubular, elongated shape with a first end 18 and an opposed second end 20. By way of example only, the shaft 12 is formed of four perpendicular oriented legs, each denoted by reference number 22, which are spaced 90° apart and integrally joined at a common center edge. The first end 18 of the shaft 12 is integrally formed with the stop 14, with the second end 20 extending axially from the first end 18 and the stop 14. It will be understood that the shaft 12 may have other shapes, such as a generally solid, cylindrical shape with a smooth outer surface.

A retainer mounting means denoted by reference number 24 is formed at a predetermined position on the shaft 12 between the first and second ends 18 and 20 thereof. The retainer mounting means 24 is generally in the form of an annular collar on each leg 22 in the form of an upstanding ridge 26 which are diametrically opposed on the shaft 12. The ridges 26 includes a front face 25 extending generally perpendicular from the leg 22 and an inclined surface 27 extending from an outer edge of the face 25 to the leg 22 to releasably engage a retainer, as described hereafter.

Seal mounting means 28 are also formed on the shaft 12. At least one and preferably two or more seal mounting means 28 are mounted on the shaft 12 adjacent the second end 20 thereof. In one embodiment shown in FIGS. 1–4, the seal mounting means 28 is in the form of an annular, constant diameter portion formed on each of the legs 22 forming the shaft 12. An annular groove, not shown, may optionally be formed on each annular portion 27. The seal mounting portions 27 have a predetermined length so as to enable a spacer element, described hereafter, to be releasably mounted on the shaft 12 between the seal means or elements mounted in the seal mounting means 27.

At least one and preferably a plurality of resilient arms 30 are integrally formed on and extend axially outward from the second end 20 of the shaft 12. Although the shaft 12 may be provided with a minimum of one resilient arm 30, at least two diametrically opposed arms 30, and, preferably, four equi-circumferentially spaced arms 30 are formed on and extend axially from the second end 20 of the shaft 12. The arms 30 are formed with a narrow cross section so as to be able to resiliently bend upon insertion of the stuffer pin 10 into a bore in a fluid carrying member, as described hereafter.

By way of example only, each arm 30, as shown in FIG. 1, includes a first inner planar side wall 32 which is parallel to the longitudinal axis of the shaft 12 and extends axially from the second end 20 of the shaft 12. Each arm 30 also has a maximum diameter outer edge 34 which is spaced from the inner side wall 32. The outer edge 34 is formed on a second side wall which is formed of a first inclined surface 36 extending radially outward from the second end 20 of the shaft 12 to the outer edge 34. A second inclined surface 38 extends radially upward from the outer edge 34 to an outer tip 40 of the arm 30. The nominal diameter of the outer edge 34 is greater than the diameter of the shaft 12 and the inside diameter of a seal element releasably mounted on the shaft 12 so as to retain the seal element on the shaft 12 as described in greater detail hereafter.

The stop 14 is integrally formed with the shaft 12 and generally has a circular, disk-like shape. The stop 14 has an outer edge with a substantially larger diameter than the nominal diameter of the shaft 12. The diameter of the stop 14 is selected to be greater than the diameter of a bore in a fluid carrying member or conduit into which the stuffer pin 10 is inserted to limit the maximum insertion distance of the stuffer pin 10 into the bore. Further, the stop 14 coacts with the projections 26 to form a mounting position for the retainer on the shaft 12.

The handle means 16 facilitates manual insertion and withdrawal of the stuffer pin 10 into and out of a bore in a fluid carrying member or engagement with an automatic insertion and withdrawal tool. By way of example only, the handle means 16 is in the form of an elongated planar member extending axially from one surface of the stop 14 opposite from the shaft 12. An aperture 44 is formed in the planar member to facilitate manual finger gripping of the handle means 16 by a user. An enlarged end flange 46 is formed on the outer axial end of the planar member. The enlarged end 46 is formed with smoothly tapering edges 48 which join elongated ribs 50 formed on opposite sides of the aperture 44.

Figure 4:
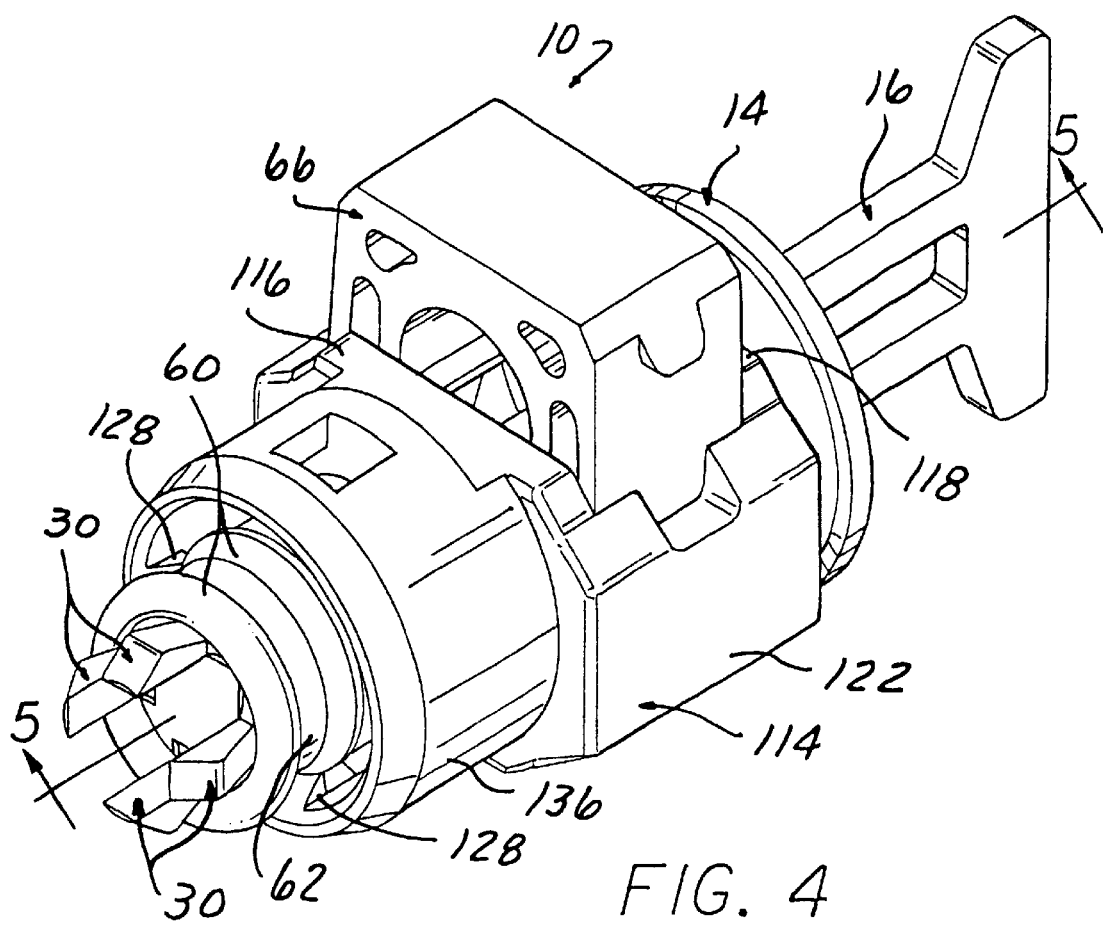
FIG. 4 is a perspective view of the stuffer pin shown in FIG. 1 carrying the full complement of sealing and retainer elements.

As shown in FIGS. 4, 5 and 6, the stuffer pin 10 releasably supports at least one and preferably a pair of seal elements 60, such as O-rings. The seal elements or O-rings 60 are releasably supported in the seal mounting portion 28 formed on the shaft 12 and are spaced apart as shown in FIG. 5 by a predetermined distance. A spacer 62 formed of a suitable plastic material, such as nylon, is releasably mounted on the shaft 12 between the seal elements 60.

In using the stuffer pin 10 of the present invention, a retainer element housing, described in greater detail hereafter, will first be urged over the second end 20 of the shaft 12 until it is seated between the projections 24 on the shaft 12 and the stop 14. The first O-ring 60 is then mounted on the shaft 12 in engagement with the innermost seal mounting means 28. The spacer 62 is then inserted over the resilient arms 30 on the shaft 12 into proximity with the first O-ring 60. The second O-ring 60 is then urged onto the shaft 12 on the outermost seal mounting means 28.

As shown in FIGS. 5 and 6, the larger nominal diameter of the outer edge 34 of the resilient arms 30 is greater than the inside diameter of the endmost O-ring 60. This retains the O-ring 60 as well as the spacer 62, and the first O-ring 60, and the housing 114 on the shaft 12 of the stuffer pin 10 after assembly onto the shaft 12 and prior to insertion of the stuffer pin 10 into a bore in a fluid carrying member.

Figure 2:
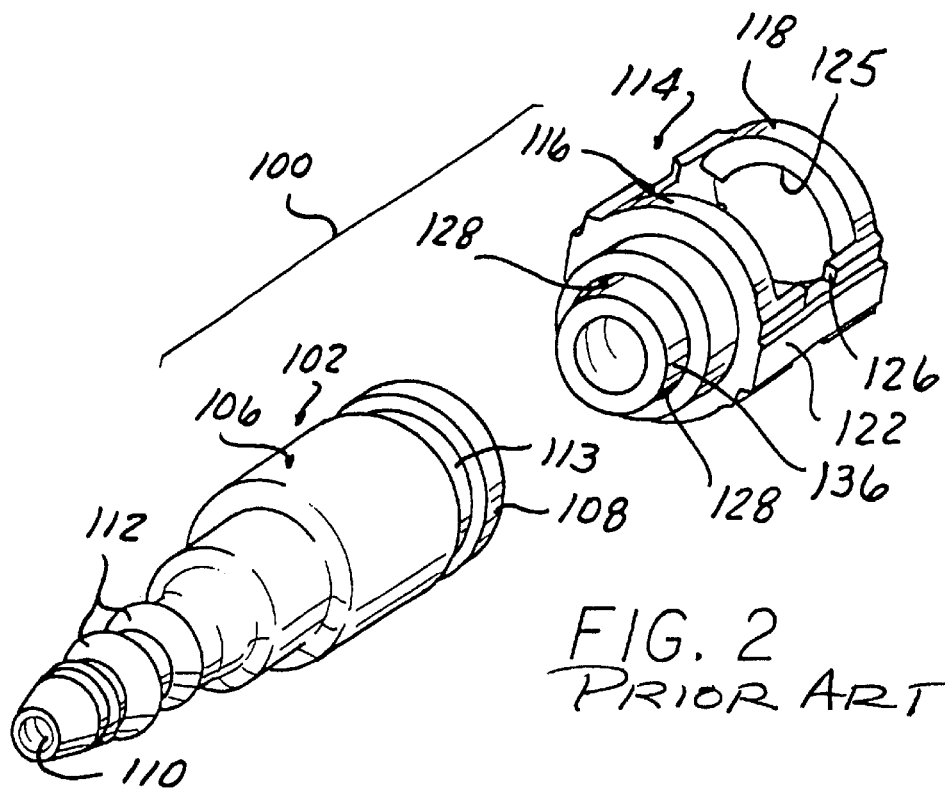
FIG. 2 is an exploded, perspective view of one aspect of a fluid quick connector usable with the stuffer pin shown in FIG. 1.

Referring to FIGS. 2 and 6, there is depicted one aspect of a rotatable two piece fluid quick connector which is usable with the stuffer pin 10 of the present invention.

As is conventional, the fluid quick connector 100 is adapted for sealingly and lockingly, yet removably interconnecting first and second fluid members, such as conduits, in a fluid tight, leak proof, sealed connection by a snap together arrangement.

The quick connector includes a housing assembly 102 formed of the first housing 106 and a second housing 114 which are adapted to be axially connected to provide an axially extending through bore between opposite ends.

The first housing 106 is formed as an integral extension of a fluid operative device, such as a manifold, valve, etc., or as shown in FIG. 6, of a one piece body, preferably of a high strength plastic, having a stepped exterior surface housing extending from a raised annular flange 108 at one end to an opposed second end 110. At least one and, preferably, a plurality of longitudinally spaced barbs or projections 112 are formed along the exterior of the first housing 106 adjacent the second end 110 for secure engagement with a flexible conduit, such as a plastic or elastomer conduit, which is slidably urged thereover, in a conventional manner, into sealed connection with the barbs 112. An annular groove or recess 113 is formed in the first housing 106 adjacent the flange 108, the purpose of which will be described hereafter.

The second housing 114 is also preferably formed of a one piece, integral, unitary body, also of a high strength plastic, typically the same plastic used to form the first housing 106. The second housing 114 includes first and second annular ring members 116 and 118, respectively. The first and second ring members 116 and 118 are spaced apart and interconnected by a pair of side flanges 122 which extend between peripheral edges of the first and second ring members 116 and 118. Notches 126 are formed along one side edge of each of the side flanges 122 for receiving an interconnecting projection in the retainer 66, as described hereafter.

Preferably, the side flanges 122 and 124 are parallel to each other and, in conjunction with the first and second ring members 116 and 118, define transversely opening apertures 125 and 127. The transversely extending apertures 125 and 127 communicate with a through bore which extends longitudinally through the second housing 114 from a first aperture 120 within the second ring member 118 to an aperture or bore 138 extending through a tubular member or sleeve 136 projecting from the first ring member 116 and terminating in a first outer end 140. The sleeve 136 also serves as a top hat for the seal elements 60, 62 and 64.

The second housing 114 is swivelably and rotatably connected to the first housing 106. The interconnection is provided by at least one and preferably two or more locking barbs or fingers 128 which extend radially inward from the sleeve 136. Preferably, the locking barbs 128 are provided in diametrically opposed pairs although uneven numbers of latch fingers 128, such as three, may also be employed.

The quick connector 100 further includes the generally U-shaped retainer 66 adapted to be received in the transverse apertures 125 and 127 in the second housing 114 such that spaced legs 146 of the retainer 66 will pass along either side of an exposed section of a tube or conduit as the retainer 66 is inserted leg-first into the second housing 114.

Each leg includes an inner projection which defines a "locking" surface adapted to axially oppose and preferably, axially engage one side of the upset bead or flange of the tube when the retainer 66 is fully inserted in the second housing 114. In this manner, the locking surface on each retainer leg serves to prevent axial displacement of the upset bead from the axial bore of the housing 102 beyond a predetermined point, thereby locking the conduit therein.

It will also be understood that the formation of the first and second housing portions 106 and 114 of the female connector 102 of the present invention may be used with other types of radially displaceable retainers shown in U.S. Pat. Nos. 5,542,716, 5,951,063 and 5,782,502.

Further, the swivel connection between two portions of a female connector element can also be applied to quick connectors having axially displaceable retainers as shown in U.S. Pat. Nos. 5,542,712 and 5,456,600.

In each of these quick connector constructions, the female connector element or housing having the enlarged housing end portion and a stepped bore portion protruding therefrom is divided into two separate housings with interlocking elements on each portion engagable with each other to non-axially displaceably interconnect the two housing portions or elements; while enabling the two housings to be rotated or swivelled relative to each other.

As is conventional, the side flanges 122 in the second housing 114 includes a pair of centralized, axially-extending, inward opening notches, not shown, while the retainer 66 includes a catch means, such as a ramped external projection or retention barb extending outwardly on each leg. The longitudinal notches cooperate with the retention barbs to releasably secure the retainer 66 in a partially-inserted, "pre-assembly" or "shipping" position within the second housing 114.

In this manner, the retainer 66 can be retained with the second housing 114 while otherwise permitting axial passage of the upset bead into the bore past the very same locking surfaces on the retainer legs that will later prevent axial displacement of the upset bead upon full insertion of retainer 66 into the second housing 114.

Figure 3:
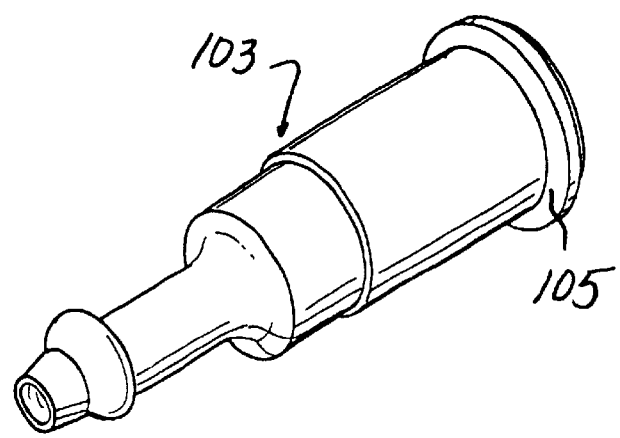
FIG. 3 is a perspective view of a quick connector having an alternate housing also usable with the stuffer pin of the present invention.

FIG. 3 depicts an alternate first housing component 103 which has a stepped through bore and at least one end barb as does the first housing 102 described above and shown in FIG. 2. In this aspect, the first housing component 103 has an enlarged end flange 105 over which the barbs 128 on the second housing component 114 snap into engagement with the flange 105 to rotatably mount the second housing component 114 to the first housing component 106 while permitting rotation of the first and second components 106 and 114 relative to each other. For example only, the first housing component 103 may be formed of metal.

The outer edges 34 of the resilient arms 30 on the stuffer pin 10 of the present invention are sized to have a diameter less than the diameter of the bore 136 in the connector part 102, but larger than the diameter of bore 139. In this manner, during insertion of the stuffer pin 10 into the connector part 102, the arms 30 will slide freely through the bore 136 in the connector part 102. However, after the stuffer pin 10 has been inserted a sufficient distance into the connector part 102, the second inclined surface 38 on the resilient arms 30 will contact a shoulder 141 formed between the bores 136 and 139. Further insertion of the stuffer pin 10 causes the resilient arms 30 to bend radially inward as the inclined surface 38 slides across the shoulder 141 into the smaller diameter bore 139 in the connector part 102 until the stuffer pin 10 reaches the full insertion position shown in FIG. 6. In this full insertion position, the endmost O-ring seal 60 is disposed in proximity or registry with the shoulder 141 in the connector part 102. At the same time, the barbs 128 snap over the flange 108 and seat in the groove 113 on the connector part 102 to lock the retainer 66 to the connector part 102.

At this time, the stuffer pin 10 may be withdrawn from the connector part 102 to the right in the orientation shown in FIG. 6. Since the sleeve 136 is locked to the connector part 102 and the retainer element 66 is likewise locked in position on the connector part 102, sliding withdrawal of the stuffer pin 10 pulls the shaft 12 out of engagement with the O-ring seals 60, the spacer 64, sleeve 136 and the retainer 66. It should be noted that the smoothly tapered or inclined surface 27 on the ridges 24 on the shaft 12 enables the shaft 12 to easily slide over the ends of the resilient arms on the retainer 66 to permit easy disengagement of the shaft 12 from the retainer 66.

It should also be noted that the handle means 16 facilitates easy insertion and withdrawal of the stuffer pin 10 into and out of the connector part 102. The aperture 44 and the enlarged end flange 46 with tapered edges 48 provides a secure finger grip to permit secure manual grasping of the stuffer pin 10. At the same time, the handle means 16 in the shape illustrated in FIG. 1 with or without a modified shape may also be adapted for use with tooling for automatic insertion and withdrawal of the stuffer pin 10 into and out of the connector part 102.

According to a unique feature of the present invention, a flange 15 formed of a single continuous annular projection or a series of circumferentially spaced projections may be integrally molded as a part of the shaft 12 of the stuffer pin 10 or provided as a separate member fixedly mounted in place intermediate the stop 14 and the projection or ridges 26 on the stuffer pin 10.

The flange 15 is positioned to be disposed in spaced relationship to the bight or central portion of the retainer 66 and has a sufficient diameter or radial extent from the exterior surface of the shaft 12 to prevent movement of the retainer 66 from the shipping position shown in FIG. 5 to a fully latched position in the housing 114. This assures that despite any rough handling during shipping or installation, the retainer 66 will remain in the temporary shipping position shown in FIG. 5 to enable an endform to be inserted through the open bore of the fluid quick connector 10 to the fully sealed position without interference with the retainer 66.

Figure 7:
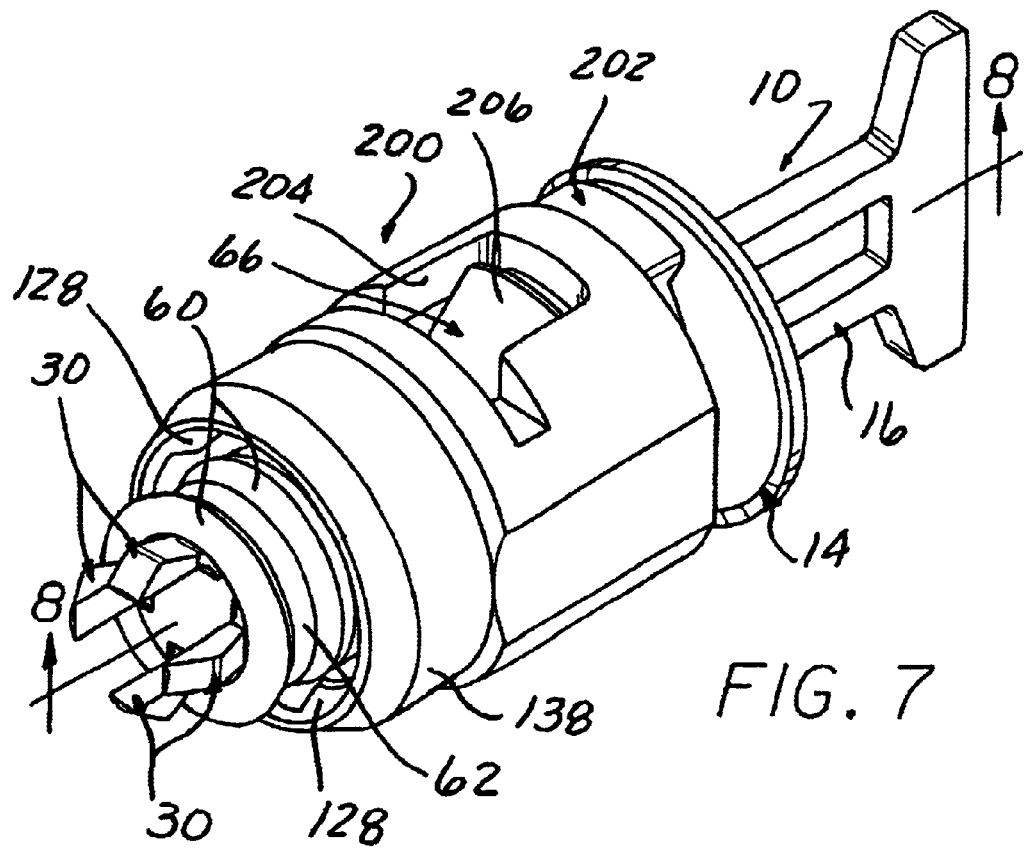
FIG. 7 is a perspective view of the stuffer pin of FIG. 1 shown carrying an axially displaceable retainer.
Figure 8:
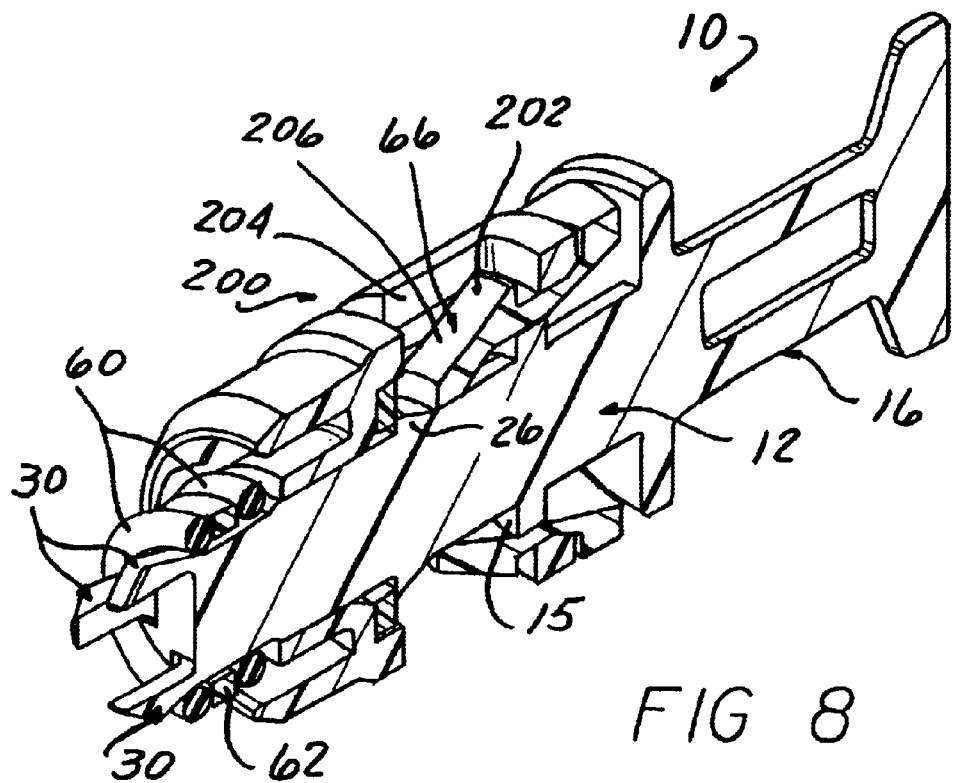
FIG. 8 is an longitudinal, cross-sectional view generally taken along line 8—8 in FIG. 7.

FIGS. 7 and 8 depict the use of the stuffer pin 10 of the present invention with a retainer housing 200 configured for receiving an axially displaceable retainer 202.

The forward most, insertion end of the retaining head or second housing component 200 is substantially identical to the forward most portion of the retaining head or second component 114 described above for the transversely or radially displaceable retainer. The second component or retaining head 200 is rotatably connectable to the first housing component 102 by means of the locking projections 128 as described above.

The second component 200 utilizes transverse mounted apertures 204 which intersect the through bore extending axially through the component 200 as latch windows for receiving a latch finger 206 on the retainer 202 to lock the retainer 202 in the component 200 as described in U.S. Pat. Nos. 5,542,712 and 5,456,600, the contents of which pertaining to the construction of the retainer 200 are incorporated herein by reference.

As shown in FIG. 8, the latch finger(s) 206 of the retainer 202 are initially pre-mounted in the retaining head or second component 200 and, as the stuffer pin 10 inserted through the through bores in the retainer 202 and the retaining head 200 flex to snap behind the bead on the inserted endform. As shown in FIG. 8, the flange or projection 15 on the stuffer pin 10, which serves a function for radially displaceable retainers as described above, has no similar function for the axially displaceable retainer 202, and does not interfere with the mounting of the retainer 202 on the stuffer pin 10 or to prevent disengagement of the stuffer pin 10 from the retaining head or second component 200 and the retainer 202 when the second component 200 is connected to the first housing component 102 as described above.

In summary, there has been disclosed a unique rotatable two part fluid quick connector stuffer pin which is capable of pre-mounting the seal elements and retainer housing portion of the two part fluid quick connector body into and on the first component. The stuffer pin carries a flange located at a position to prevent premature movement of a radially movable retainer in the retainer housing from moving to the fully latched position in the retainer housing portion of the two part fluid quick connector. At the same time, the flange does not interfere with the pre-mounting of an axial retainer in the retainer housing of the two part fluid quick connector.

What is claimed is:

1. A stuffer pin for a fluid quick connector, the quick connector formed of a first housing having a bore extending between first and second ends and receiving at least one seal element, and a retainer housing having a bore extending between first and second ends, the retainer housing rotatably joinable to the first housing, a retainer carried in the retainer housing for locking a tubular member in the joined first housing and the retainer housing, the stuffer pin comprising:

a shaft with first and second ends, the shaft including means for mounting at least one seal member, and means for mounting a retainer housing adapted for receiving a retainer, between the first and second ends for mounting the seal member and the retainer housing in the first housing.

2. The stuffer pin of claim 1 further comprising:

a retainer carried on the retainer housing and movable between a first partially inserted position and a second position in the retainer housing.

3. The stuffer pin of claim 2 further comprising:

means carried on the shaft retainer housing mounting means on the shaft between the first and second ends, of the shaft for preventing movement of the retainer from the first position to the second position prior to removal of the stuffer pin from the retainer housing.

4. The stuffer pin of claim 3 wherein the means for preventing movement of the retainer comprises:

a flange extending radially from the shaft.

5. The stuffer pin of claim 1 further comprising:

a stop spaced from the first end of the shaft and extending radially outward from the shaft;

means, carried with the stop and extending from the shaft, for facilitating handling of the shaft into and out of the bore in the first housing, the seal member mounting means, carried on the shaft, for releasably supporting the at least one seal element on the shaft;

means, formed on the shaft, adjacent to the seal element mounting means and capable of bending movement upon insertion into the bore in the first housing, for fixedly retaining the at least one seal element on the shaft prior to insertion into the bore in the first housing; and the retainer housing mounting means, formed on the shaft, between the stop and the seal element mounting means, for releasably mounting the retainer housing on the shaft.

6. The stuffer pin of claim 5, wherein the retainer housing mounting means comprises:

projection means, carried on the shaft, for engaging a portion of the retainer housing to position a portion of the retainer housing between the stop and the projection means.

7. The stuffer pin of claim 5 wherein:

the shaft includes a plurality of radially and axially extending legs, the legs circumferentially spaced apart.

8. The stuffer pin of claim 1 wherein the projection means comprises:

one radial projection carried on each leg.

9. A combination fluid quick connector and stuffer pin comprising:

a first housing having a bore extending between first and second ends and receiving at least one seal element;

a retainer housing having a bore extend between first and second ends, the retainer housing joinable to the first housing;

a retainer carried in the retainer housing for locking a tubular member in the joined first housing and the retainer housing;

a stuffer pin for coupling to the first housing, the stuffer pin including a shaft with first and second ends, the shaft including means for mounting at least one seal member, and means for mounting a retainer housing adapted for receiving a retainer between the first and second ends for mounting the seal member and the retainer housing in the first housing.

10. The combination of claim 9 further comprising:

a retainer carried on the retainer housing and movable between a first partially inserted position and a second position in the retainer housing.

11. The combination of claim 10 further comprising:

means carried on the shaft retainer housing mounting means on the shaft between the first and second ends of the shaft for preventing movement of the retainer from the first position to the second position prior to removal of the stuffer pin from the retainer housing.

12. The combination of claim 11 further comprising:

a stop spaced from the first end of the shaft and extending radially outward from the shaft;

means, carried with the stop and extending from the shaft, for facilitating handling of the shaft into and out of the bore in the first housing, seal element mounting means, carried on the shaft, for releasably supporting the at least one seal element on the shaft;

means, formed on the shaft, adjacent to the seal element mounting means and capable of bending movement upon insertion into the bore in the first housing, for fixedly retaining the at least one seal element on the shaft prior to insertion into the bore in the first housing; and means, formed on the shaft, between the stop and the seal element mounting means, for releasably mounting the retainer housing on the shaft.

13. The combination of claim 12 wherein the retainer housing mounting means comprises:

projection means, carried on the shaft, for engaging a portion of the retainer housing to position a portion of the retainer housing between the stop and the projection means.

14. The combination of claim 13 wherein the projection means comprises:

one radial projection carried on each leg.

15. The combination of claim 11 wherein the means for preventing movement of the retainer comprises:

a flange extending radially from the shaft.

16. The combination of claim 1 wherein:

the shaft includes a plurality of radially and axially extending legs, the legs circumferentially spaced apart.

* * * * *